United States Patent
Yoshii et al.

(10) Patent No.: US 7,263,211 B2
(45) Date of Patent: *Aug. 28, 2007

(54) INFORMATION PROCESSING APPARATUS AND METHOD, COMPUTER-READABLE MEMORY, AND PROGRAM

(75) Inventors: Hiroto Yoshii, Tokyo (JP); Hatsuo Machida, Kanagawa (JP); Masaru Okazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/220,663

(22) Filed: Sep. 8, 2005

(65) Prior Publication Data

US 2006/0002593 A1    Jan. 5, 2006

Related U.S. Application Data

(62) Division of application No. 10/001,974, filed on Dec. 5, 2001, now Pat. No. 6,970,581.

(30) Foreign Application Priority Data

Dec. 27, 2000    (JP)    ............... 2000-399329

(51) Int. Cl.
G06K 9/00    (2006.01)
G06K 11/06    (2006.01)

(52) U.S. Cl. ............ 382/119; 382/187; 713/186; 902/3; 348/161; 178/18.01

(58) Field of Classification Search ........ 382/115–124; 340/5.2, 5.3, 5.52, 5.53; 902/3; 713/186; 73/865.4; 178/18.01–20.04; 348/161

See application file for complete search history.

(56) References Cited

U.S. PATENT DOCUMENTS

| 4,086,567 | A | | 4/1978 | Crane et al. ............... 382/123 |
|---|---|---|---|---|
| 4,190,820 | A | | 2/1980 | Crane et al. ............... 382/123 |
| 5,343,537 | A | * | 8/1994 | Bellegarda et al. ......... 382/186 |
| 5,588,073 | A | * | 12/1996 | Lee et al. ................... 382/187 |
| 5,706,427 | A | | 1/1998 | Tabuki .................. 395/187.01 |
| 5,864,296 | A | | 1/1999 | Upton ...................... 340/5.53 |
| 6,101,280 | A | | 8/2000 | Reynolds ................... 382/241 |
| 6,148,093 | A | | 11/2000 | McConnell ................ 382/119 |
| 6,160,914 | A | | 12/2000 | Muroya .................... 382/187 |
| 6,185,333 | B1 | | 2/2001 | Arai et al. .................. 382/187 |
| 6,285,785 | B1 | * | 9/2001 | Bellegarda et al. ......... 382/187 |
| 6,549,675 | B2 | | 4/2003 | Chatterjee .................. 382/244 |

(Continued)

FOREIGN PATENT DOCUMENTS

EP    0 848 345    6/1998

(Continued)

Primary Examiner—Bhavesh M Mehta
Assistant Examiner—Aaron W Carter
(74) Attorney, Agent, or Firm—Fitzpatrick, Cella, Harper & Scinto

(57) ABSTRACT

An information processing apparatus detects the sampling rate of a coordinate input device, and standardizes the writing data which is input from the coordinate input device based on the detected sampling rate. The standardized writing data is further used for signature verification or for handwritten character recognition. The information processing apparatus provides precise signature verification or handwritten character recognition even if signatures or handwritten characters for handwritten character recognition are input using digitizers having different processing rates.

22 Claims, 8 Drawing Sheets

U.S. PATENT DOCUMENTS 6,970,581 B2 * 11/2005 Yoshii et al. ................ 382/119
2004/0156537 A1 * 8/2004 Chung et al. ............... 382/119

FOREIGN PATENT DOCUMENTS

| JP | 9-81518 | 3/1997 |
| JP | 9-81519 | 3/1997 |
| JP | 10-143668 | 5/1998 |
| JP | 10-171926 | 6/1998 |

* cited by examiner

FIG. 5

| X1 (t1) | X2 (t1) | X3 (t1) | X4 (t1) | t1 |
| --- | --- | --- | --- | --- |
| X1 (t2) | X2 (t2) | X3 (t2) | X4 (t2) | t2 |
| X1 (t3) | X2 (t3) | X3 (t3) | X4 (t3) | t3 |
| ⋮ | ⋮ | ⋮ | ⋮ | ⋮ |
| X1 (tn) | X2 (tn) | X3 (tn) | X4 (tn) | tn |

INFORMATION PROCESSING APPARATUS AND METHOD, COMPUTER-READABLE MEMORY, AND PROGRAM

This application is a division of application Ser. No. 10/001,974 filed Dec. 5, 2001, now U.S. Pat. No. 6,970,581.

BACKGROUND OF THE INVENTION

1. Field of the Invention

The present invention relates to an information processing apparatus and method for processing data which is input through a coordinate input device, a computer-readable memory, and a program.

2. Description of the Related Art

A so-called signature authentication system has been well known which uses a signature to verify the authenticity of a user. Such a system typically employs a signature authentication method as disclosed in Japanese Patent Laid-Open No. 10-143668 and No. 10-171926 entitled "HANDWRITTEN CHARACTER STRING VERIFICATION METHOD AND APPARATUS." In this method, user writing data functioning as a password is used to verify a handwritten character string. Unlike passwords, however, writing data contains features specific to individuals, and others who enter the same word as that of one person might not be verified. The features include the shape of the written character, character writing order, character writing speed, and rhythm.

In this signature authentication method using a handwritten character string verification technique, an input device, known as a digitizer, is used to input signature data of a user to a computer in order to perform signature authentication. The handwritten character string verification technique is achieved by dynamic programming (DP) matching time-series data, such as coordinate data, writing pressure data, or writing speed data, which is captured using a digitizer, with the registration data that has been registered in a verification dictionary.

As further disclosed in Japanese Patent Laid-Open No. 9-81518 and No. 9-81519 entitled "VERIFICATION METHOD ON NETWORK," writing data is exchanged on a server-client system, allowing the same writing data to be used as a password in different environments such as homes and offices.

In the related art, techniques using a digitizer include a handwritten character recognition technique to recognize handwritten characters plotted with pens, and a handwriting word processor in which characters or pictures plotted with pens are filed as data.

However, such a signature authentication method in the related art has caused a large difference in quality of the captured writing data depending upon the capabilities of the digitizers. In particular, in a client-server system, the signature authentication method has experienced a problem in that a user does not always use the same digitizer in the client, and the writing data transmitted from the client to the server may sometimes greatly differ. Digitizers having different processing rates would make the detected coordinates different, and the signature data itself may therefore be different, thereby prohibiting satisfactory authentication.

A handwritten character recognition technique and a handwriting word processor (handwriting stroke database) technique also have a problem in that the performance depends upon the capability of the digitizer.

SUMMARY OF THE INVENTION

Accordingly, it is an object of the present invention to allow signatures which are entered using digitizers having different processing rates to be registered and verified. Therefore, signatures signed by a user using different client devices can be verified by a server.

To this end, in one aspect of the present invention, an information processing apparatus which processes data input through a coordinate input device includes a detector which detects the sampling rate of the coordinate input device, and a standardizer which standardizes writing data which is input through the coordinate input device based on the sampling rate detected by the detector.

The information processing apparatus may further include a transmitter which transmits the standardized writing data to a verification server for signature verification.

In another aspect of the present invention, a verification server linked to an information processing apparatus having different coordinate input devices over a network includes a receiver which receives standardized writing data which is transmitted. The standardized writing data is generated by standardizing writing data which is input through a coordinate input device in the information processing apparatus based on the sampling rate of that coordinate input device. The verification server further includes a signature verifier which performs signature verification based on the standardized writing data received by the receiver.

Other features and advantages of the patent invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and, together with the description, serve to explain the principles of the invention.

FIG. 5 shows an example data structure of time-stamped writing data according to the first embodiment.

DESCRIPTION OF THE PREFERRED EMBODIMENTS

Preferred embodiments of the present invention will now be described in detail with reference to the drawings.

First Embodiment

Figure 1:
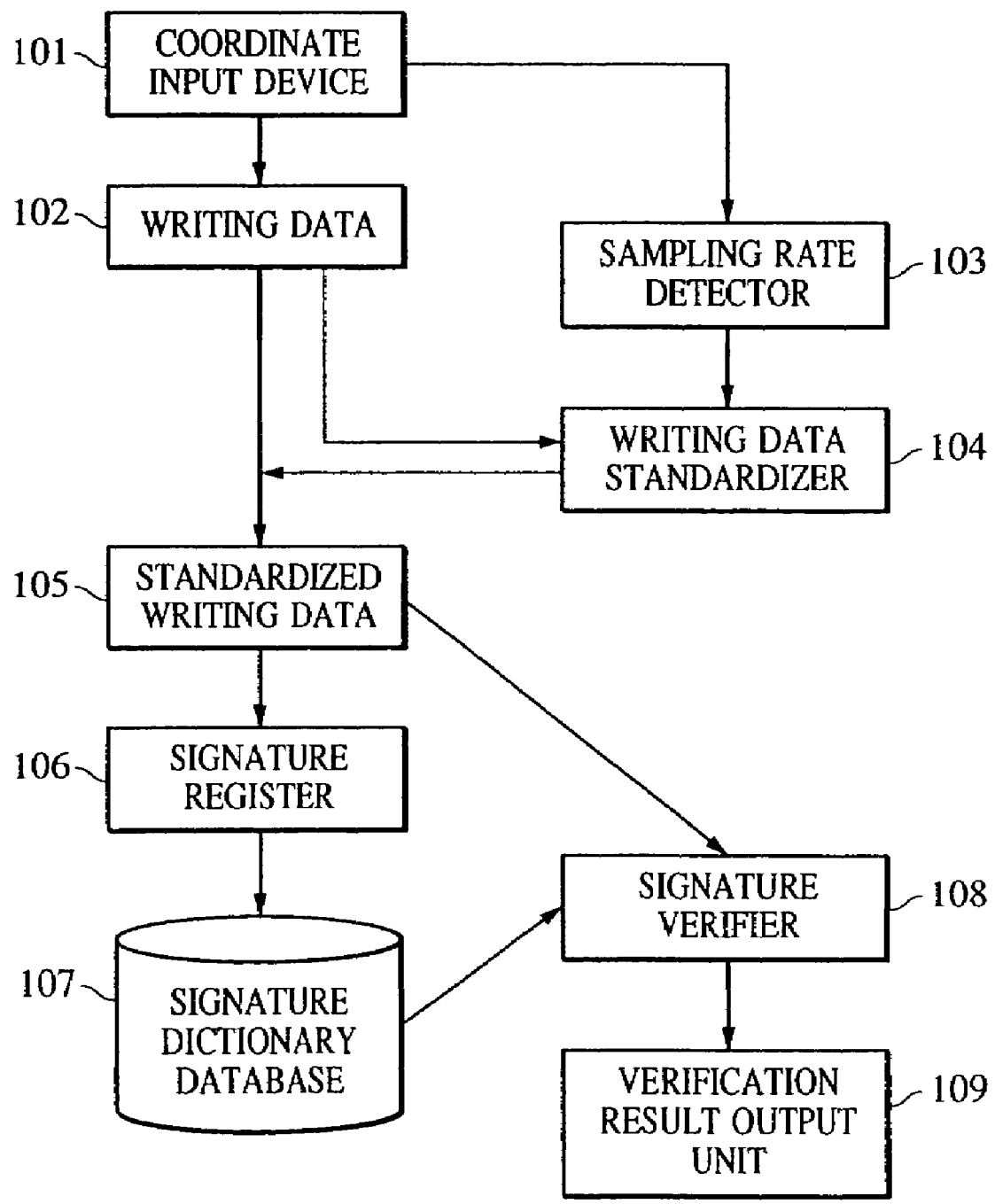
FIG. 1 is a block diagram of an information processing apparatus according to a first embodiment of the present invention.

FIG. 1 is a block diagram of an information processing apparatus according to a first embodiment of the present invention.

A coordinate input device 101 comprises the above-noted "digitizer," and captures coordinate time-series data which is input through an input device such as a pen. Some digitizers can capture information including writing pressure and writing speed. Writing data (stroke data) 102 is input using the coordinate input device 101.

A sampling rate detector 103 detects the sampling rate which is used for detection of the coordinate input which is one characteristic of the digitizer. A writing data standardizer 104 standardizes the writing data 102 based on the detected sampling rate. The thus standardized writing data 105 may be absolute time interval information which does not depend upon characteristics of the digitizer or characteristics of the information processing apparatus to which the writing data 102 is input.

A signature register 106 is executed to initially register the standardized writing data 105 of a user in a signature dictionary database 107 as signature dictionary data in order to verify the signature when the user uses the information processing apparatus. The signature dictionary database 107 manages to associate the identification information used to identify users of the information processing apparatus with the signature dictionary data.

Once a user requests access to the information processing apparatus, a signature verifier 108 refers to the signature dictionary database 107 having the signature data of that user pre-registered therein. The signature verifier 108 then verifies the registered signature dictionary data of that user with the standardized writing data 105 generated from the writing data which is newly input by the user to authenticate the signature. A verification result output unit 109 outputs the verification result, and the signature verification process is completed.

In the first embodiment, a program that controls the sampling rate detector 103, the writing data standardizer 104, the signature register 106, the signature dictionary database 107, the signature verifier 108, and the verification result output unit 109 is installed in a single information processing apparatus. Since the program is used to standardize the writing data, a single program which is installed in an information processing apparatus having different kinds of digitizers would support the digitizers.

The process executed by the sampling rate detector 103 is described below with reference to FIG. 2.

Figure 2:
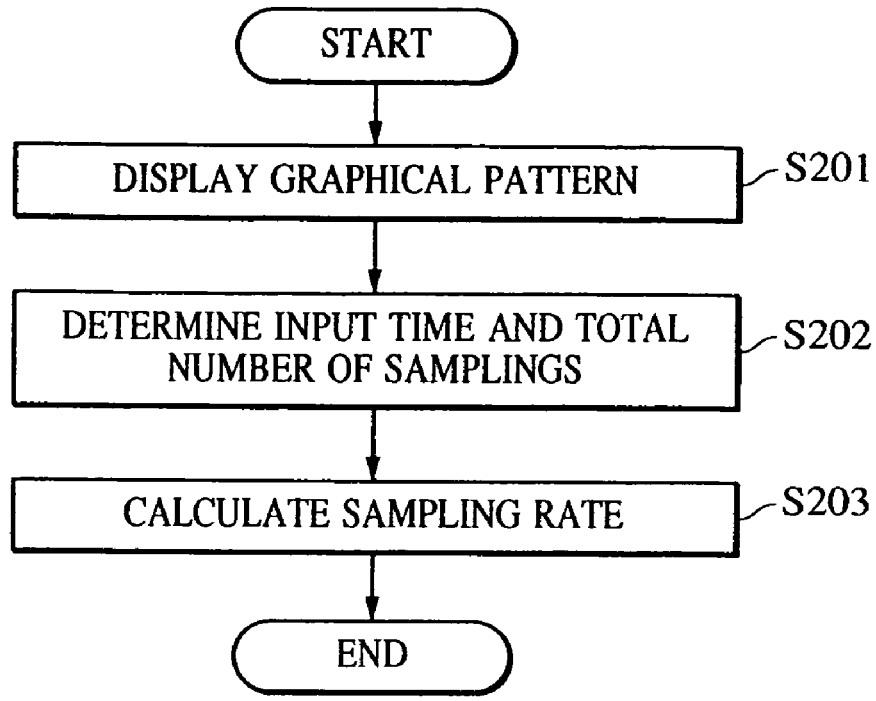
FIG. 2 is a flowchart of the process executed by a sampling rate detector according to the first embodiment.

FIG. 2 is a flowchart of the process executed by the sampling rate detector 103 according to the first embodiment.

First, at step S201, the information processing apparatus displays a certain graphical pattern for sampling rate detection on an input screen of the coordinate input device 101 to instruct the user to trace this graphical pattern using a pen.

At step S202, the user's pen input on the graphical pattern for sampling rate detection is detected to determine an input time period from the beginning to the end of the pen input and the total number of samplings during the input time period.

At step S203, the sampling rate per unit time is calculated based on the determined input time period and total number of samplings. The calculated sampling rate is output to the writing data standardizer 104.

An example operation of the sampling rate detector 103 is described below with reference to FIG. 3.

Figure 3:
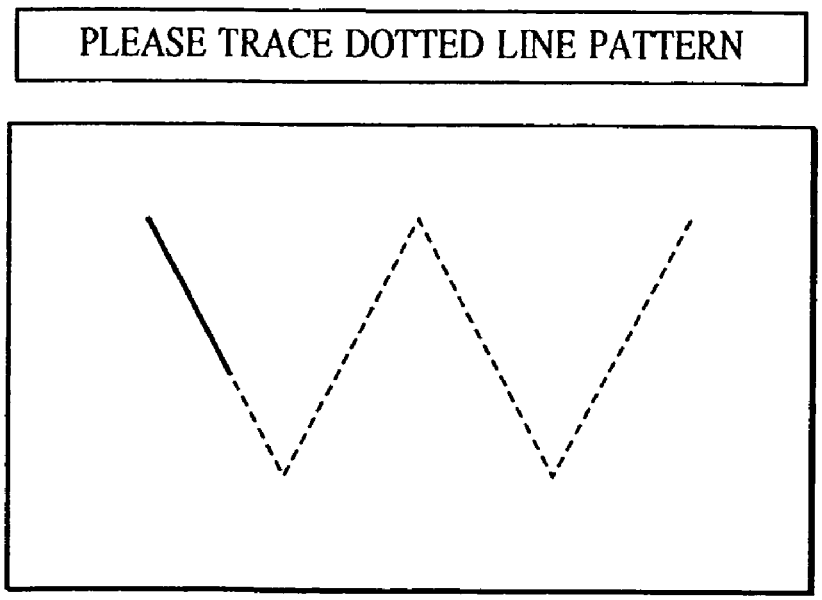
FIG. 3 is a view of an example operation of the sampling rate detector according to the first embodiment.

FIG. 3 shows an example operation of the sampling rate detector 103 according to the first embodiment.

In FIG. 3, by way of example, a graphical pattern "W" for sampling rate detection is displayed on the input screen of the coordinate input device (digitizer) 101, and the information processing apparatus instructs the user to trace the graphical pattern. This graphical pattern is not limited to a character, and may be a circle or the like. Any pattern may be used as long as the pattern represents a graphic image or a character capable of providing enough samplings. The total number of samplings is divided by the time for which the pen is in contact with the digitizer, that is, the total of time for which the digitizer detects the position of the pen, thereby determining the number of samplings per unit time. Typically, the unit time is one second, and the number of samplings per unit time may vary from 10 to 1000.

The number of samplings per unit time which is determined by the sampling rate detector 103 is usually greater than needed. In other words, there is a sufficient, or rather excessive, number of samplings in order to express smooth and natural strokes using sequences of points. One problem associated with an excessive number of samplings is sensitivity to various noise, causing jagged strokes. Basically, the preferable number of samplings is about 20 points per second, and this number of samplings may be set for a standard stroke.

The number of samplings per unit time which is determined by the sampling rate detector 103 may vary depending upon the state of the information processing apparatus connected to the digitizer. However, since the number of samplings is inherently unique to a digitizer and an information processing apparatus, the number of samplings which is defined when the driver for the digitizer is installed would be semi-permanently used.

The process executed by the writing data standardizer 104 is described below with reference to FIG. 4.

Figure 4:
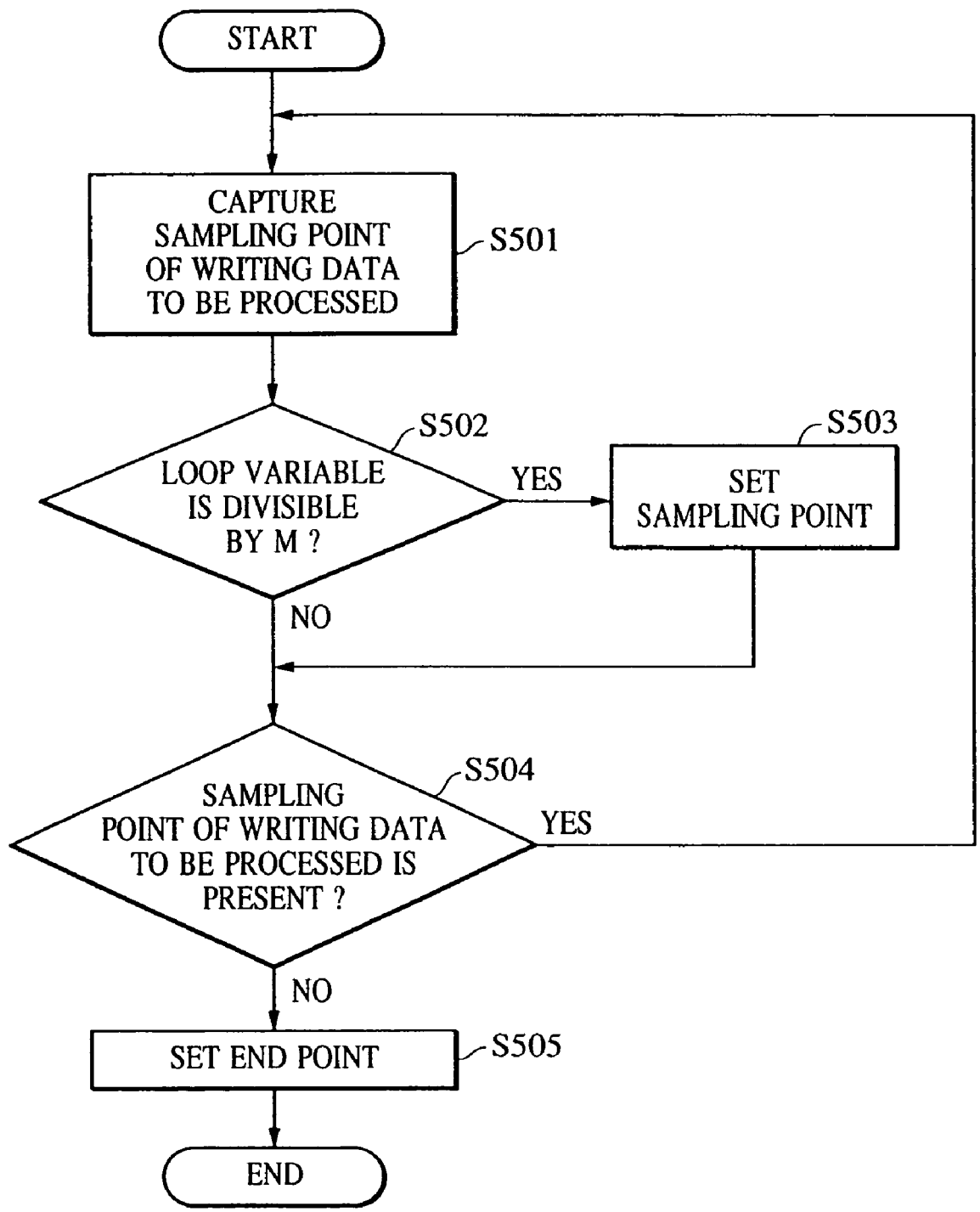
FIG. 4 is a flowchart of the process executed by a writing data standardizer according to the first embodiment.

FIG. 4 is a flowchart of the process executed by the writing data standardizer 104 according to the first embodiment.

As described with respect to FIG. 3, user writing data which is input through a digitizer principally has a larger number of samplings than the number of samplings of the above-described standard stroke. Therefore, it is necessary to decimate some sampling points which are included in the user writing data. The process to decimate sampling points is illustrated in FIG. 4.

At step S501, sampling points of the writing data to be processed are captured from the beginning. Each time a sampling point is captured, the loop from step S501 to step S504 is repeated. The loop starts at step S501, where the loop variable is indicated by "i" and starts at zero. This is expressed in the C language as follows:

for(i=0; i<N; i++) {description of the process} where N denotes the number of sampling points of the writing data.

In FIG. 4, it is assumed that the writing data has 500 sampling points per second, while the standard stroke has 20 sampling points per second. Then, 24 points must be decimated every 25th point. This is performed at determination step S502, where M is 25 in this example. More generally, it is determined at step S502 whether or not the loop variable is divisible by M. If the loop variable is not divisible by M, i.e., if NO is obtained at step S502, the process proceeds to step S504. Otherwise, i.e., if the loop variable is divisible by M, the process proceeds to step S503, in which the sampling point to be processed is set into a standardized writing data register.

It is determined at step S504 whether or not there is a sampling point of the writing data to be processed. If the sampling point is present, or YES is obtained at step S504, the sampling point to be processed increments by one, and the process returns to step S501. Otherwise, or if the sampling point is not present at step S504, the process proceeds to step S505.

At step S505, the end point of the sampling point of the writing data to be processed is set into the standardized writing data register.

In the flowchart of FIG. 4, the starting point has a loop variable of 0, by which any number is divisible. Thus, the sampling point of the starting point of the writing data is always set into the standardized writing data register. Next, the sampling point having a loop variable of 25 is set into the standardized writing data register, followed by the sampling point having a loop variable of 50, and so on. Accordingly, the sampling points having a loop variable of multiples of 25 are in turn set into the standardized writing data register. After the sampling points of the writing data to be processed have been all processed and the end point of the sampling point has been set into the standardized writing data register, the trajectory of the sampling points that have been set into the standardized writing data register corresponds to the standardized writing data.

If the number of samplings in the writing stroke which is input through the digitizer is smaller than the number of samplings of the standard stroke, sampling points must be interpolated between the sequence of sampling points of the input writing data to create a standardized writing stroke. The process to interpolate sampling points is described below with reference to FIGS. 5 to 8. The interpolation method basically includes adding virtual timestamps to the sampling points of the writing data, and adding new sampling points between the sampling points based on the timestamps.

The data structure of time-stamped writing data is described below with reference to FIG. 5.

FIG. 5 is a table of an example data structure of time-stamped writing data according to the first embodiment.

The time-stamped writing data is made by virtually adding the absolute time of the sampling point (timestamp information) to the writing data input through a digitizer. The timestamp information allows the user to know the interval of the sampling time from the sampling rate. Therefore, the number of a sampling point from the starting point of sampling is studied to readily determine the absolute time of the sampling point. FIG. 5 shows the timestamp information in a table, in which the time at which the corresponding sampling point was captured is presented in the last column for each row.

The time-stamped writing data shown in FIG. 5 is constructed by adding the timestamp information to four-dimensional writing data. Generally, timestamp information is added to n-dimensional writing data to generate (n+1)-dimensional writing data, which is called time-stamped writing data. The writing data includes x-coordinates and y-coordinates of data which is input by a user through a digitizer, writing pressure information, and writing speed information.

The operation of the writing data standardizer 104 is described below with reference to FIG. 6.

Figure 6:
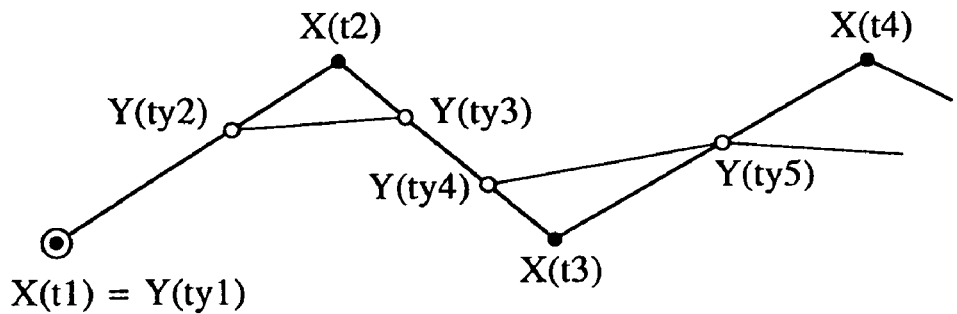
FIG. 6 is a schematic view of the operation of the writing data standardizer according to the first embodiment.

FIG. 6 schematically shows the operation of the writing data standardizer 104 according to the first embodiment.

The zigzag line plotted in FIG. 6 schematically indicates the writing data, in which a black circle denotes a sampling point(=writing data) and a white circle denotes a standardized sampling point(=standardized writing data). The standardized writing data is made by linearly approximating between the time-stamped writing data. Herein, a data group of the sampling points is indicated by X, and a data group of the standardized sampling points is indicated by Y. Both X and Y shown in FIG. 6 are symbols indicating n-dimensional vectors. Although both X and Y are schematically plotted on a two-dimensional plane in FIG. 6, they may be plotted so as to include sampling information from the digitizer, such as writing pressure information and writing speed information, in addition to the coordinate information.

The timestamp information of the time-stamped writing data is indicated by t1, t2, t3, t4, etc., and the timestamp information of the standardized writing data is indicated by ty1, ty2, ty3, ty4, ty5, etc. It is assumed that the time interval of the standardized writing data (reference sampling interval) is constant.

The process executed by the writing data standardizer 104 is now described with reference to FIG. 7.

Figure 7:
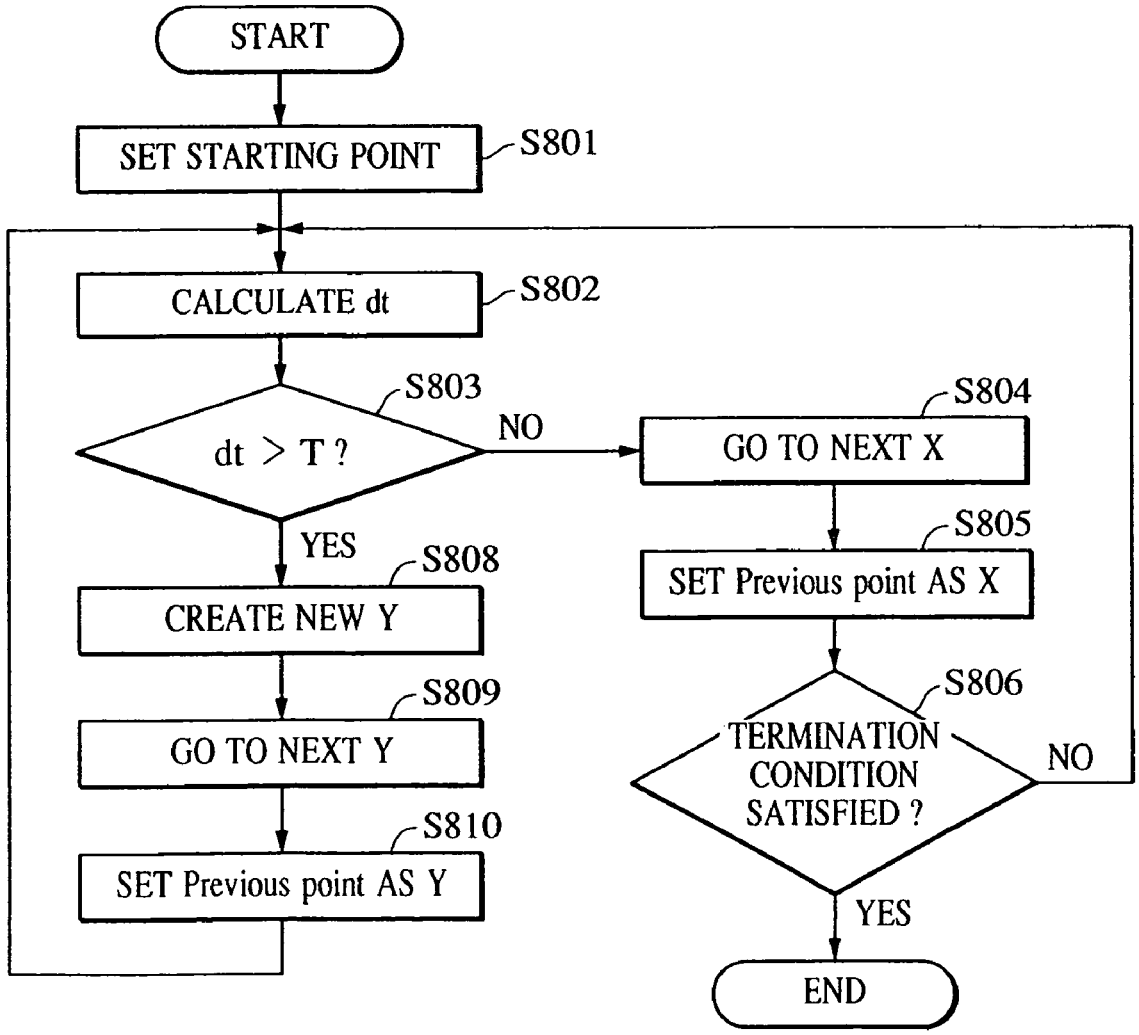
FIG. 7 is a flowchart of the process executed by the writing data standardizer according to the first embodiment.
Figure 8:
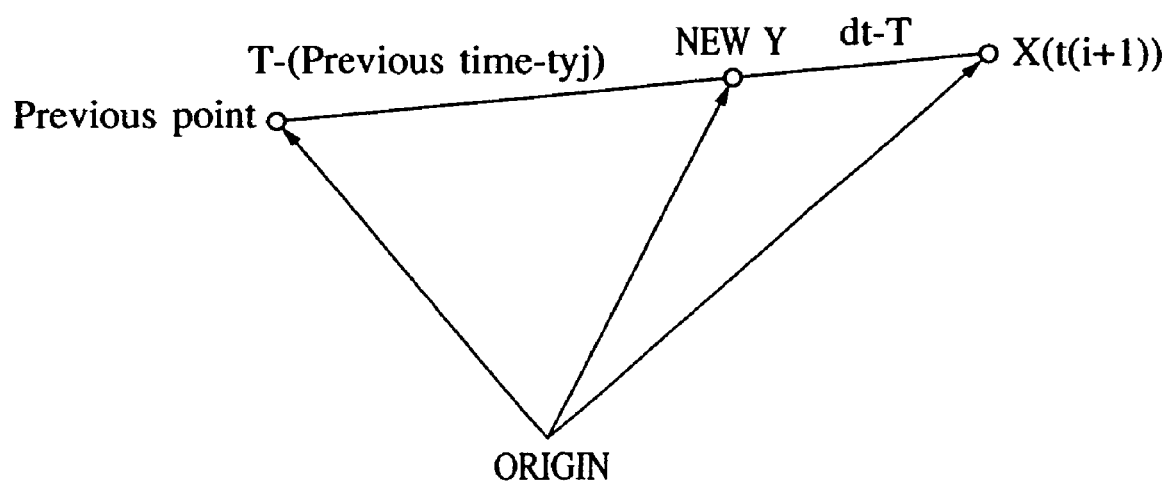
FIG. 8 is a view showing calculation of an interpolated point according to the first embodiment.

FIG. 7 is a flowchart of the process executed by the writing data standardizer 104 according to the first embodiment.

In the definition of the symbols in the flowchart of FIG. 7, the i-th (index "i") data in the data group X of the sampling points of the writing data input through a digitizer is indicated by X(ti), and j-th (index "j") data in the data group Y of the sampling points of the standardized writing data is indicated by Y(tyj). According to this notation, the data group X of the input writing data corresponds to a set of X(ti), and the data group Y of the standardized writing data corresponds to a set of Y(tyj). The point X(t1) is the starting point of the input writing data, and coincides with the starting point Y(ty1) of the standardized writing data.

Furthermore, in the definition of the symbols in FIG. 7, dt denotes the time interval between the last determined Y point and the next X point (dt=t(i+1)−tyj); T denotes the reference time interval (reference sampling interval) of the standardized writing data group Y; and "Previous point" indicates the X or Y point previous to a new Y point, and the "Previous point" and the X point next thereto are the basis for generating a new Y point.

In the following description with respect to the flowchart of FIG. 7, equations are expressed in the C language.

First, at step S801, the starting point is set. More specifically, the following equations are satisfied: i=1, j=1, ty1=t1, Y(ty1)=X(t1), and Previous point=X(t1). Then, vector X(t1) and vector Y(ty1) are matched with each other, as shown in FIG. 6.

Then, at step S802, dt (the time interval between the last determined Y point and the next X point) is calculated. This calculation is performed according to the following equation: dt={t(i+1)−tyj}.

At step S803, it is determined whether or not dt>T. If dt>T, or YES is obtained at step S803, the process proceeds to step S808. Otherwise, or if NO is obtained at step S803, the process proceeds to step S804.

For example, if Y is on Y(ty2) and X is on X(t1) in FIG. 6 (i=1 and j=2), then dt≦T. Then, the process proceeds to step S804. If Y is on Y(ty3) and X is on X(t2) (i=2 and j=3), then dt>T. Then, the process proceeds to step S808.

At step S804, X to be processed is shifted to the next X. Specifically, "i" increments. At step S805, "Previous point" is set as X to execute "Previous point=X(ti)." At step S806, it is determined whether or not the termination condition is satisfied (whether or not "Previous point" reaches the end point of X, i.e., i=n). If the termination condition is not satisfied, or NO is obtained at step S806, the process returns to step S802. If the termination condition is satisfied, or YES is obtained at step S806, the process to create standardized writing data is completed.

At step S808, new Y is created. Specifically, the point which is on a straight line connecting a vector "Previous point" to a vector X(t(i+1)) and which is (T−((previous_time)−tyj)) later than "Previous point," that is, the point prior to X(t(i+1)) by (dt−T), is approximated, and the result is set as the next Y. As used herein, "previous_time" indicates timestamp information of "Previous point." Hence, the vector equation to calculate the new Y is as follows:

$$Y(yt(j+1))=X(t(i+1))+(\text{Previous point}-X(t(i+1)))*(dt-T)/(t(i+1)-\text{previous\_time}).$$

At the same time, yt(j+1)=ytj+T is also calculated. This is geometrically plotted in FIG. 8 using a vector space model.

After the new Y has been created, at step S809, Y to be processed is shifted to the next Y (the newly created Y). Specifically, j increments.

At step S810, "Previous point" is set as Y. Specifically, "Previous point=Y(tyj)" is calculated. Then, the process returns to step S802.

As above described, in the first embodiment, the standardized writing data which is obtained by standardizing the writing data which is input through the coordinate input device is managed. This ensures precise signature verification on the input writing data having a resolution with a low sampling rate.

Furthermore, a single program which is installed in an information processing apparatus having different kinds of digitizers would support all digitizers.

Second Embodiment

In the first embodiment, signature verification of a user who uses the information processing apparatus has been described. The components of the information processing apparatus in the first embodiment may be incorporated into a server or client device in a server-client signature authentication system to embody the present invention. For example, the client may include the coordinate input device 101, the sampling rate detector 103, and the writing data standardizer 104 shown in FIG. 1, and the server may include the signature register 106, the signature dictionary database 107, the signature verifier 108, and the verification result output unit 109 shown in FIG. 1, so that the client and the server can transmit and receive data to and from each other over a network. In this case, if the client has different kinds of digitizers, writing data is standardized and the standardized writing data is transmitted to the server, allowing the server to facilitate signature authentication. If a user uses a client having a different kind of digitizer from the client which is used by the user to register his/her signature, the signature can be verified by the server.

Accordingly, if a plurality of clients linked to a server have different performances, or if coordinate input devices linked to the clients have different performances (such as sampling rate), signature authentication would also be achieved.

Third Embodiment

In a third embodiment of the present invention, the above-noted standardized writing data 105 is used for handwritten character recognition instead of signature authentication.

Figure 9:
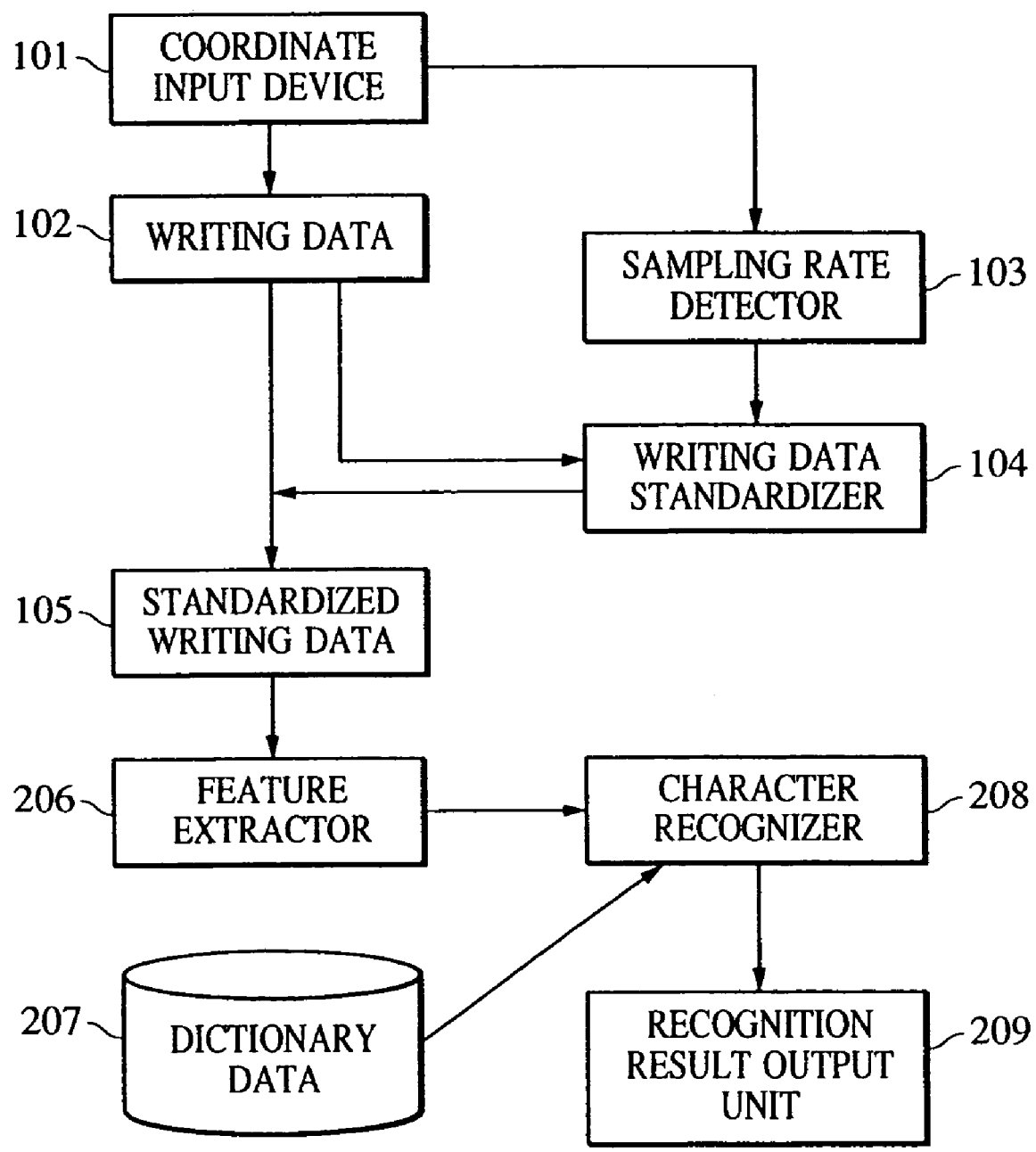
FIG. 9 is a block diagram of an information processing apparatus according to a third embodiment of the present invention.

FIG. 9 is a block diagram of an information processing apparatus according to the third embodiment.

The same reference numerals designate the same components as those in the information processing apparatus shown in FIG. 1, and the description thereof is thus omitted.

In the context of handwritten character recognition, a feature extractor 206 extracts features of the standardized writing data 105. A character recognizer 208 refers to dictionary data 207, in which extracted features of standard characters are accumulated in advance, to perform character recognition on the standardized writing data 105. A recognition result output unit 209 outputs character code strings corresponding to the recognition result of the character recognizer 208.

Accordingly, in the third embodiment, the writing data which is input through a coordinate input device is standardized, and the standardized writing data is used to perform character recognition on the input writing data. This ensures precise signature verification on the input writing data having a resolution with a low sampling rate.

Fourth Embodiment

In a fourth embodiment of the present invention, the above-noted standardized writing data 105 is used for a handwriting word processor instead of signature authentication.

Figure 10:
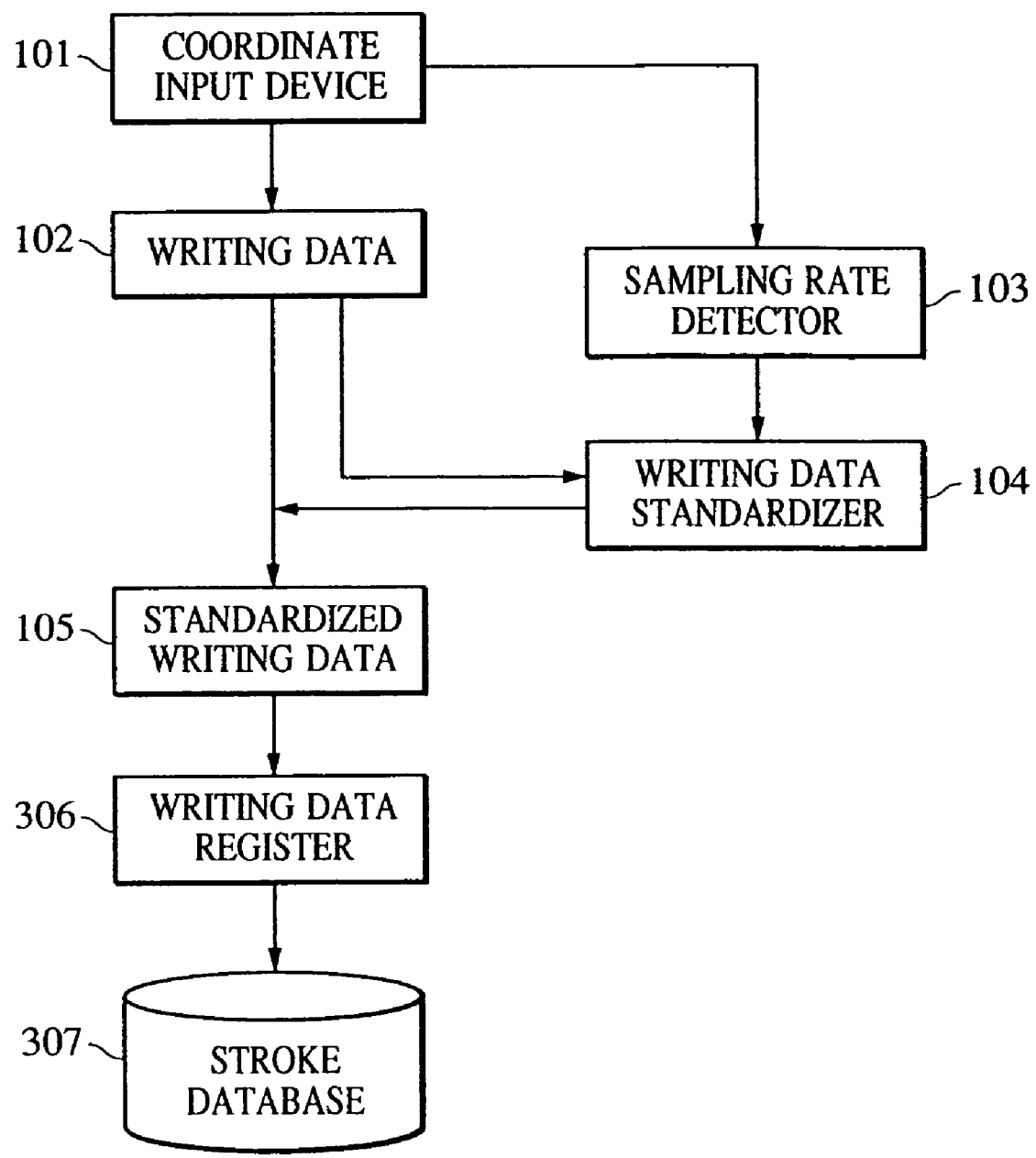
FIG. 10 is a block diagram of an information processing apparatus according to a fourth embodiment of the present invention.

FIG. 10 is a block diagram of an information processing apparatus according to the fourth embodiment.

The same reference numerals designate the same components as those in the information processing apparatus shown in FIG. 1, and the description thereof is thus omitted.

In the context of a handwriting word processor, a writing data register 306 registers the standardized writing data 105 into a stroke database 307. The writing data 102 is not directly registered into the stroke database 307, but is standardized before being registered into the stroke database 307.

Accordingly, in the fourth embodiment, the writing data which is input through a coordinate input device is standardized, and the standardized writing data is used to output stroke data. Therefore, stroke data having more suitable configurations can be output. When the stroke database 307 is searched for arbitrary stroke data, particularly, when the writing data which is input by the client having a different kind of digitizer in a server-client database system is transmitted as a search parameter to the server, that writing data is standardized and the standardized writing data is used as a search parameter to execute searching. Therefore, search that does not differ from person to person can be efficiently and precisely executed.

Other Embodiments

An information processing apparatus according to any one of the first to fourth embodiments comprises components (not shown) constituting a general-purpose computer such as a personal computer or a workstation, including a keyboard, a mouse, a display, a CPU, a RAM, and a ROM.

Of course, the foregoing object of the present invention is also achieved by incorporating a storage medium having program code of software implementing the features of the above-described embodiments recorded therein into a system or an apparatus, and by allowing a computer (or CPU or MPU) in the system or the apparatus to read and execute the program code stored in the storage medium.

In this case, the program code read from the storage medium implements the features of the illustrated embodiments. Therefore, the storage medium having the program code stored therein embodies the present invention.

Storage media which provide program code include a floppy disk, a hard disk, an optical disk, a magneto-optical disk, a CD-ROM, a CD-R/RW, a DVD-ROM/RAM, a magnetic tape, a nonvolatile memory card, and a ROM.

The program code read by a computer is executed to implement the features of the illustrated embodiments. In addition, the program code may instruct the operating system (OS) running on the computer to execute a part or all of the actual process, thereby implementing the features of the illustrated embodiments. This case is also encompassed by the present invention.

The program code read from a storage medium is written to a memory mounted on a function expansion board inserted into a computer or on a function expansion unit connected to a computer. Thereafter, the program code instructs a CPU or the like mounted on the function expansion board or the function expansion unit to execute a part of all of the practical process, thereby implementing the features of the illustrated embodiments. This case is also encompassed by the present invention.

The storage medium for which the present invention is implemented will store program code corresponding to the process as previously described with respect to the flowcharts.

As described above, according to the present invention, signature verification would be performed on writing data which are input using different kinds of digitizers.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus which processes data input through a coordinate input device, said information processing apparatus comprising:
    inputting means for inputting writing data through the coordinate input device;
    detecting means for detecting the sampling rate per unit time of the coordinate input device by determining the number of samplings of the writing data that occur during an input period, determining the length of the input period measured using a predetermined unit of time, and dividing the number of samplings by the determined length of time; and
    standardizing means for standardizing writing data which is input through the coordinate input device, the standardizing being based on the sampling rate detected by said detecting means,
    wherein the writing data of the detected sampling rate is standardized to the writing data of a predetermined sampling rate.

2. An information processing apparatus according to claim 1, wherein the writing data standardized by said standardizing means is used for signature authentication.

3. An information processing apparatus according to claim 1, wherein the writing data standardized by said standardizing means is used for handwritten character recognition.

4. An information processing apparatus according to claim 1, wherein the writing data standardized by said standardizing means is registered into a stroke database.

5. An information processing apparatus according to claim 1, wherein the writing data standardized by said standardizing means is used as the output for the writing data which is input through the coordinate input device.

6. An information processing apparatus according to claim 1, wherein said standardizing means standardizes the writing data by decimating a group of stroke points indicated by the writing data based on the detected sampling rate.

7. An information processing apparatus according to claim 1, wherein said standardizing means standardizes the writing data by interpolating a group of stroke points indicated by the writing data based on the detected sampling rate.

8. An information processing apparatus according to claim 1, further comprising transmitting means for transmitting the standardized writing data to a verification server for signature verification.

9. A verification server linked to an information processing apparatus having different coordinate input means over a network, the information processing apparatus comprising:
    inputting means for inputting writing data through the coordinate input device;
    detecting means for detecting the sampling rate per unit time of the coordinate input device by determining the number of samplings of the writing data that occur during an input period, determining the length of the input period measured using a predetermined unit of time, and dividing the number of samplings by the determined length of time;
    standardizing means for standardizing writing data which is input through the coordinate input device, the standardizing being based on the sampling rate detected by said detecting means, wherein the writing data of the detected sampling rate is standardized to the writing data of a predetermined sampling rate; and
    transmitting means for transmitting the standardized writing data to the verification server for signature verification,
    said verification server comprising:
    receiving means which receives the standardized writing data transmitted by said transmitting means; and
    signature verifying means which performs signature verification based on the standardized writing data received by said receiving means.

10. An information processing method of processing data input through a coordinate input device, said information processing method comprising the steps of:
    inputting writing data through the coordinate input device;
    detecting the sampling rate per unit time of the coordinate input device by determining the number of samplings of the writing data that occur during an input period, determining the length of the input period measured using a predetermined unit of time, and dividing the number of samplings by the determined length of time; and
    standardizing writing data which is input through the coordinate input device, the standardizing being based on the sampling rate detected in said detecting step, wherein the writing data of the detected sampling rate is standardized to the writing data of a predetermined sampling rate.

11. An information processing method according to claim 10, wherein the writing data standardized in said standardizing step is used for signature authentication.

12. An information processing method according to claim 10, wherein the writing data standardized in said standardizing step is used for handwritten character recognition.

13. An information processing method according to claim 10, wherein the writing data standardized in said standardizing step is registered into a stroke database.

14. An information processing method according to claim 10, wherein the writing data standardized in said standardizing step is used as the output for the writing data which is input through the coordinate input device.

15. An information processing method according to claim 10, wherein said standardizing step standardizes the writing data by decimating a group of stroke points indicated by the writing data based on the detected sampling rate.

16. An information processing method according to claim 10, wherein said standardizing step standardizes the writing data by interpolating a group of stroke points indicated by the writing data based on the detected sampling rate.

17. An information processing method according to claim 10, further comprising the step of transmitting the standardized writing data to a verification server for signature verification.

18. A verification method of performing signature verification on standardized writing data which is input from an information processing apparatus having different coordinate input means over a network, said method comprising the steps of:
receiving standardized writing data, the standardized writing data being made by standardizing writing data which is input through the coordinate input means in the information processing apparatus, the standardizing being based on a detected sampling rate per unit time of the coordinate input means by determining the number of samplings of the written data that occur during an input period, determining the length of the input period measured using a predetermined unit of time, and dividing the number of samplings by the determined length of time, and the standardized writing data being transmitted over a network, wherein the standardized writing data is the writing data of a predetermined sampling rate; and
performing signature verification based on the standardized writing data received in said receiving step.

19. A computer-readable memory having a stored verification computer program for performing signature verification on standardized writing data which is input from an information processing apparatus having different coordinate input means over a network, the program including the steps of:
receiving standardized writing data, the standardized writing data being made by standardizing writing data which is input through the coordinate input means in the information processing apparatus, the standardizing being based on a detected sampling rate per unit time of the coordinate input means by determining the number of samplings of the written data that occur during an input period, determining the length of the input period measured using a predetermined unit of time, and dividing the number of samplings by the determined length of time, and the standardized writing data being transmitted over a network, wherein the standardized writing data is the writing data of a predetermined sampling rate; and
performing signature verification based on the standardized writing data received in said receiving step.

20. A computer-readable medium having a stored verification computer program for performing signature verification on standardized writing data on which is input from an information processing apparatus having different coordinate input means over a network, the program including the steps of:
receiving standardized writing data, the standardized writing data being made by standardizing writing data which is input through the coordinate input means in the information processing apparatus, the standardizing being based on a detected sampling rate per unit time of the coordinate input means by determining the number of samplings of the writing data that occur during an input period, determining the length of the input period measured using a predetermined unit of time, and dividing the number of samplings by the determined length of time, and the standardized writing data being transmitted over a network, wherein the standardized writing data is the writing data of a predetermined sampling rate; and
performing signature verification based on the standardized writing data received in said receiving step.

21. A computer-readable medium having a stored information processing computer program to process data which is input from a coordinate input device, the program including the steps of:
inputting writing data through the coordinate input device;
detecting the sampling rate per unit time of the coordinate input device by determining the number of samplings of the writing data that occur during an input period, determining the length of the input period measured using a predetermined unit of time, and dividing the number of samplings by the determined length of time; and
standardizing writing data which is input through the coordinate input device, said standardizing being based on the sampling rate detected in said detecting step,
wherein the writing data of the detected sampling rate is standardized to the writing data of a predetermined sampling rate.

22. A computer-readable medium embodied with a computer program, having program code which allows an information processing apparatus to execute an information process of processing data which is input from a coordinate input device, the program code including the steps of:
inputting writing data through the coordinate input device;
detecting the sampling rate per unit time of the coordinate input device by determining the number of samplings of the writing data that occur during an input period, determining the length of the input period measured using a predetermined unit of time, and dividing the number of samplings by the determined length of time; and
standardizing writing data which is input through the coordinate input device based on the sampling rate detected in said detecting step,
wherein the writing data of the detected sampling rate is standardized to the writing data of a predetermined sampling rate.

* * * * *